United States Patent
Kondo

(10) Patent No.: US 9,890,694 B2
(45) Date of Patent: Feb. 13, 2018

(54) INTERNAL COMBUSTION ENGINE

(75) Inventor: Tetsuo Kondo, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 343 days.

(21) Appl. No.: 14/412,342

(22) PCT Filed: Jul. 5, 2012

(86) PCT No.: PCT/JP2012/067208
§ 371 (c)(1),
(2), (4) Date: Dec. 31, 2014

(87) PCT Pub. No.: WO2014/006721
PCT Pub. Date: Jan. 9, 2014

(65) Prior Publication Data
US 2015/0184582 A1 Jul. 2, 2015

(51) Int. Cl.
*F02B 29/06* (2006.01)
*F02D 35/00* (2006.01)
*F02D 41/14* (2006.01)
*F02D 41/24* (2006.01)
(Continued)

(52) U.S. Cl.
CPC ............ *F02B 29/06* (2013.01); *F02B 25/145* (2013.01); *F02D 13/0219* (2013.01);
(Continued)

(58) Field of Classification Search
CPC .... F02B 29/06; F02B 25/145; F02D 13/0219; F02D 13/0261; F02D 35/0092;
(Continued)

(56) References Cited

U.S. PATENT DOCUMENTS 7,275,516 B1 * 10/2007 Cunningham ........ F02B 25/145
123/305
8,495,865 B2 * 7/2013 Okada ................. F02D 13/0246
123/90.15
(Continued)

FOREIGN PATENT DOCUMENTS

JP 4-365949 A 12/1992
JP 2003-83134 A 3/2003
(Continued)

OTHER PUBLICATIONS

International Search Report dated Aug. 7, 2012 in PCT/JP12/067208 Filed Jul. 5, 2012.

*Primary Examiner* — Thomas Moulis
*Assistant Examiner* — John Bailey
(74) *Attorney, Agent, or Firm* — Oblon, McClelland, Maier & Neustadt, L.L.P.

(57) ABSTRACT

An internal combustion engine includes a turbocharger, a variable valve gear, an A/F sensor in an exhaust passage, A/F feedback control means, and scavenge A/F control means. The variable valve gear drives intake and exhaust valves, and can drive with a valve open characteristic with valve overlap. The A/F feedback control means performs feedback correction of a fuel injection amount based on an A/F sensor output, and acquires a learning value of information relating to A/F control from a feedback correction amount. The scavenge A/F control means carries out A/F control by a value learned during an operation of the engine with non-scavenge valve open characteristic, when the variable valve gear is operated with the scavenge valve open characteristic. The scavenge valve open characteristic has a valve overlap amount of such a degree that blow-by of intake air occurs in an intake stroke during a turbocharger operation.

8 Claims, 7 Drawing Sheets

(51) Int. Cl.
- *F02D 41/00* (2006.01)
- *F02D 13/02* (2006.01)
- *F02B 25/14* (2006.01)
- *F02M 26/05* (2016.01)
- *F02M 26/06* (2016.01)

(52) U.S. Cl.
CPC ..... *F02D 13/0261* (2013.01); *F02D 35/0092* (2013.01); *F02D 41/0007* (2013.01); *F02D 41/1456* (2013.01); *F02D 41/2448* (2013.01); *F02D 41/2454* (2013.01); *F02D 2041/001* (2013.01); *F02M 26/05* (2016.02); *F02M 26/06* (2016.02); *Y02T 10/144* (2013.01); *Y02T 10/18* (2013.01)

(58) Field of Classification Search
CPC ............ F02D 41/0007; F02D 41/1456; F02D 41/2448; F02D 41/2454; F02D 2041/001; F02D 35/00; F02M 26/05; F02M 26/06; Y02T 10/144; Y02T 10/18
USPC ....... 123/674, 672, 339.12, 704, 443, 90.15, 123/90.16, 90.17, 90.18; 701/101, 103, 701/104, 105, 109
See application file for complete search history.

(56) References Cited

U.S. PATENT DOCUMENTS

| | | | |
|---|---|---|---|
| 9,103,293 B2* | 8/2015 | Jankovic | F02D 41/1456 |
| 9,255,534 B2* | 2/2016 | Tsuyuki | F02D 23/02 |
| 9,291,110 B2* | 3/2016 | Matsuda | F02D 13/0223 |
| 9,353,697 B2* | 5/2016 | Kawabe | F02D 41/34 |
| 2002/0116918 A1* | 8/2002 | Morikawa | F02B 1/12 60/285 |
| 2007/0056560 A1* | 3/2007 | Trask | F01L 9/04 123/435 |
| 2008/0065310 A1* | 3/2008 | Trask | F01L 9/04 701/103 |
| 2009/0177370 A1 | 7/2009 | Kawakita et al. | |
| 2009/0205612 A1* | 8/2009 | Wermuth | F02D 41/1462 123/406.19 |
| 2009/0277434 A1* | 11/2009 | Surnilla | F01L 9/04 123/65 R |
| 2010/0024785 A1 | 2/2010 | Yoshioka | |
| 2010/0170460 A1* | 7/2010 | Leone | F02D 13/0219 123/90.16 |
| 2011/0126519 A1* | 6/2011 | Okada | F02D 13/0246 60/276 |
| 2012/0283931 A1* | 11/2012 | Otsuka | F02B 37/18 701/103 |
| 2012/0316756 A1* | 12/2012 | Tsuyuki | F02D 35/023 701/104 |
| 2015/0337744 A1* | 11/2015 | Matsuda | F02D 41/0002 123/344 |

FOREIGN PATENT DOCUMENTS

| | | |
|---|---|---|
| JP | 2006 194112 | 7/2006 |
| JP | 2006 250115 | 9/2006 |
| JP | 2008 175201 | 7/2008 |

* cited by examiner

Fig. 1
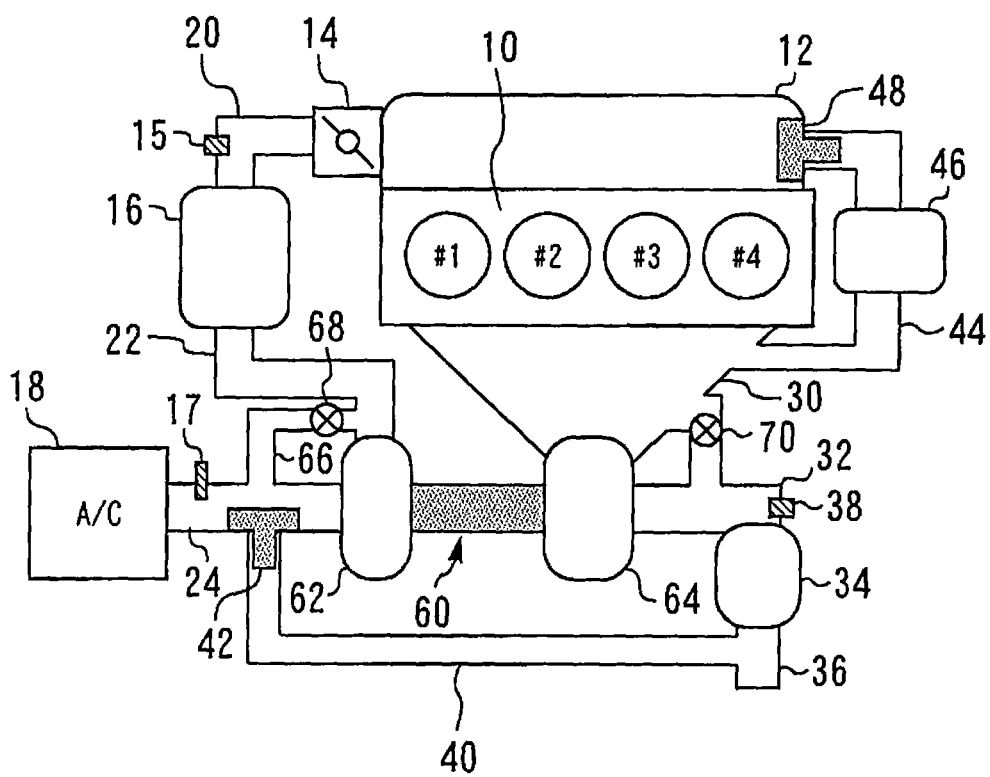
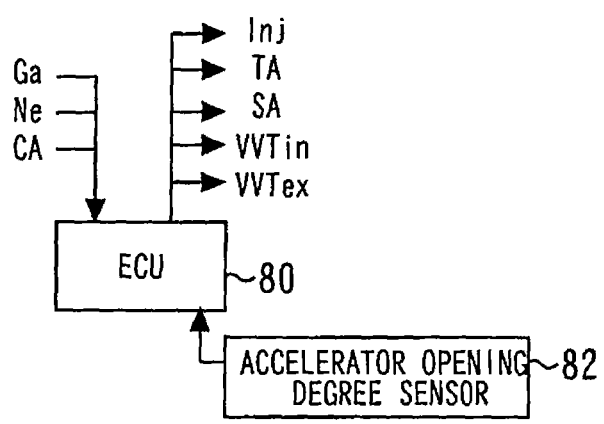

Fig. 3

| EQUAL INTAKE AIR AMOUNT REGION | $A_1$ | $A_2$ | ... | $A_{k-1}$ | $A_k$ | $A_{k+1}$ | $A_{k+2}$ | ... | $A_m$ |
|---|---|---|---|---|---|---|---|---|---|
| FB CORRECTION AMOUNT LEARNING VALUES (%) | $b_1$ | $b_2$ | ... | $b_{k-1}$ | $b_k$ | $b_{k+1}$ | $b_{k+2}$ | ... | $b_m$ |
| LEARNING HISTORY | PRESENT | PRESENT | ... | PRESENT | PRESENT | PRESENT | PRESENT | ... | ABSENT |

INTERNAL COMBUSTION ENGINE

TECHNICAL FIELD

The present invention relates to an internal combustion engine.

BACKGROUND ART

Conventionally, there has been known an internal combustion engine in which blow-by of intake air (fresh air) occurs, as disclosed in Japanese Patent Laid-Open No. 2006-194112, for example. An internal combustion engine of this kind includes a turbocharger, and is provided with a predetermined amount of valve overlap amount under a high intake pressure situation during an operation of the turbocharger, whereby a part of intake air blows to an exhaust port. When the blow-by occurs, a cylinder filled air amount becomes smaller than an intake air amount predicted from an air flow meter.

Blow-by of fresh air like this is also called "scavenge", and "scavenge control" that utilizes this is sometimes carried out. Scavenge control is to flow intake air out into an exhaust passage together with the combustion gas in a cylinder by using an overlap time period in which both an intake valve and an exhaust valve open, and has an effect of scavenging a cylinder residual gas. Hereinafter, an operation region where scavenge occurs will be also referred to as "a scavenge establishment region".

In order to perform air-fuel ratio control precisely during scavenge control, the cylinder filled air amount needs to be obtained precisely after the blow-by amount of fresh air is taken into consideration. With an output value from the cylinder pressure sensor as a basis, an actual cylinder filled air amount can be calculated precisely. By using this point, the prior art according to the above described publication calculates the cylinder filled air amount based on the output value of the cylinder pressure sensor when blow-by of fresh air is recognized. Thereby, a suitable fuel injection amount is calculated from a control target air-fuel ratio with respect to the cylinder filled air amount, and the cylinder air-fuel ratio can be made to correspond to the control target air-fuel ratio. As a result, air-fuel ratio controllability can be kept.

CITATION LIST

Patent Literature

Patent Literature 1: Japanese Patent Laid-Open No. 2006-194112
Patent Literature 2: Japanese Patent Laid-Open No. 2008-175201
Patent Literature 3: Japanese Patent Laid-Open No. 2006-250115

SUMMARY OF INVENTION

Technical Problem

There is the problem that due to the situation that is brought about at the air-fuel ratio sensor side in the exhaust passage, the air-fuel ratio controllability can be reduced. That is to say, during scavenge control, the fresh air which blows through the cylinder reaches the air-fuel ratio sensor in the exhaust passage, and the air-fuel ratio sensor issues a lean output. Thereafter, combustion is performed with the fresh air which remains in the cylinder without blowing through the cylinder, and the combusted gas reaches the air-fuel ratio sensor. By repetition of the above, the air-fuel ratio sensor repeats a detection operation of temporarily detecting the lean air-fuel ratio by the fresh air, and thereafter detecting the combusted gas air-fuel ratio (rich or stoichiometry).

Under the situation as above, due to the lean output by the fresh air, it becomes difficult to carry out air-fuel ratio feedback control using the air-fuel ratio sensor output precisely and stably. It is conceivable to stop feedback control using the air-fuel ratio sensor output temporarily and carry out air-fuel ratio control in a feedforward manner, during scavenge control. However, by simply stopping the feedback control, favorable emission characteristics are not always ensured. The conventional art still has a room for improvement with respect to the countermeasure to reduction in air-fuel ratio controllability during scavenge control like this.

The present invention is made to solve the problem as described above, and has an object to provide an internal combustion engine that can restrain reduction in air-fuel ratio controllability under a situation where blow-by of intake air occurs.

Means for Solving the Problem

A first aspect of the present invention is a internal combustion engine, comprising: a turbocharger, a variable valve gear, an air-fuel ratio sensor, air-fuel ratio feedback control means, scavenge air-fuel ratio control means. The variable valve gear drives an intake valve and an exhaust valve, and can drive with a valve open characteristic provided with valve overlap. The air-fuel ratio sensor is provided in an exhaust passage. The air-fuel ratio feedback control means performs feedback correction of a fuel injection amount based on an output from the air-fuel ratio sensor, and acquires a learning value of information relating to air-fuel ratio control from a correction amount of the feedback correction. The scavenge air-fuel ratio control means carries out air-fuel ratio control by using the learning value which is learned during an operation of the internal combustion engine with a valve open characteristic that is not a scavenge valve open characteristic, when the variable valve gear is operated with the scavenge valve open characteristic. The scavenge valve open characteristic is a valve open characteristic having a valve overlap amount of such a degree that blow-by of intake air occurs in an intake stroke during an operation of the turbocharger.

A second aspect of the present invention is a further preferable aspect of the internal combustion engine according to the first aspect, wherein the air-fuel ratio feedback control means includes means for performing feedback correction of the fuel injection amount based on the output from the air-fuel ratio sensor so that an air-fuel ratio of an exhaust gas corresponds to a control target air-fuel ratio. Further, the air-fuel ratio feedback control means also includes means for learning a correction amount about the fuel injection amount in the feedback correction, and storing a value obtained by the learning by associating the value with an intake air amount as the learning value of the information relating to the air-fuel ratio control. Further, the air-fuel ratio feedback control means also includes means for correcting a deviation between an air-fuel ratio obtained from the output of the air-fuel ratio sensor and the air-fuel ratio of the exhaust gas by using the learning value.

When an operation request under a specific load that belongs to a scavenge load region, the scavenge air-fuel ratio control means selects a learning value associated with an intake air amount corresponding to the specific load from a plurality of the learning values. The scavenge load region is a load region where the blow-by occurs by driving with the scavenge valve open characteristic arises during an operation of the turbocharger. The plurality of the learning values are learned during an operation of the internal combustion engine at a time of operating the variable valve gear with the valve open characteristic that is not the scavenge valve open characteristic. The scavenge air-fuel ratio control means carries out feedback control or feedforward control of the air-fuel ratio.

A third aspect of the present invention is a further preferable aspect the internal combustion engine according to the first or second aspect, further comprising: valve mechanism control means. The valve mechanism control means, when an operation request under the specific load belonging to a scavenge load region, operates a control one of followings. That is, the valve mechanism control means operates the variable valve gear with the scavenge valve open characteristic when the learning value about the intake air amount corresponding to the specific load is already learned. On the other hand, the valve mechanism control means operates the variable valve gear with a valve open characteristic that is not the scavenge valve open characteristic when the learning value about the intake air amount corresponding to the specific load is not learned. The scavenge load region is a load region where the blow-by occurs by driving with the scavenge valve open characteristic arises during an operation of the turobocharger.

A fourth aspect of the present invention is a further preferable aspect the internal combustion engine according to the third aspect, wherein the scavenge air-fuel ratio control means carries out feedback control of the air-fuel ratio. Here, the scavenge air-fuel ratio control means executes leveling processing. The leveling processing is processing of smoothing an output signal from the air-fuel ratio sensor in a time direction, in a time period in which the valve mechanism control means operates the variable valve gear with the scavenge valve open characteristic. Further, the scavenge air-fuel ratio control means performs feedback correction of the fuel injection amount based on the learning value and the smoothed signal, in the time period in which the valve mechanism control means operates the variable valve gear with the scavenge valve open characteristic.

A fifth aspect of the present invention is a further preferable aspect the internal combustion engine according to any one of the first to fourth aspects, further comprising: an air flow meter; and a catalyst that is provided downstream of the air-fuel ratio sensor in the exhaust passage. Further, the scavenge air-fuel ratio control means calculates the fuel injection amount based on a control target air-fuel ratio by using an intake air amount obtained from an output from the air flow meter when the variable valve gear is operated with the scavenge valve open characteristic during an operation of the turbocharger.

A sixth aspect of the present invention is an internal combustion engine, comprising: a turbocharger, a variable valve gear, an air-fuel ratio sensor provided in an exhaust passage, air-fuel ratio control means, and valve mechanism control means. The variable valve gear drives an intake valve and an exhaust valve, and can drive with a valve open characteristic provided with valve overlap. The air-fuel ratio control means for performing feedback correction of a fuel injection amount based on an output from the air-fuel ratio sensor, acquiring a learning value of information relating to air-fuel ratio control from a correction amount of the feedback correction, and carrying out air-fuel ratio control by using the learning value.

The valve mechanism control means is capable of control of driving the variable valve gear with a scavenge valve open characteristic. The scavenge valve open characteristic is a valve open characteristic having a valve overlap amount of such a degree that blow-by of intake air occurs in an intake stroke during an operation of the turbocharger. The valve mechanism control means operates one of following controls, when an operation request arises, which is under a specific load in a predetermined high load region during an operation of the turbocharger. That is, the valve mechanism control means operates the variable valve gear with the scavenge valve open characteristic when control by the air-fuel ratio control means is carried out in an equal intake air amount region of the specific load before the operation request. On the other hand, the valve mechanism control means operates the variable valve gear with a valve open characteristic that is not the scavenge valve open characteristic, when the control by the air-fuel ratio control means is not carried out in the equal intake air amount region of the specific load before the operation request.

Advantageous Effect of Invention

According to the first aspect of the present invention, during scavenge control, the air-fuel ratio control also can be carried out precisely by suitably using the learning value which is obtained during non-scavenge control.

According to the second aspect of the present invention, the learning value corresponding to the intake air amount can be suitably selected from a plurality of learning values stored by the means for storing the values by associating the values with the intake air amounts as the learning values of the information relating to the air-fuel ratio control. By using the selected learning value, even during scavenge control, the deviation between the exhaust gas air-fuel ratio and the air-fuel ratio sensor output can be corrected precisely.

According to the third aspect of the present invention, when an operation request in the scavenge establishment region arises, the valve open characteristic can be switched to the scavenge valve open characteristic after it is accurately confirmed that the learning value usable in air-fuel ratio control is already learned.

According to the fourth aspect of the present invention, during the scavenge control, the air-fuel ratio feedback control also can be continued without excessively impairing controllability.

According to the fifth aspect of the present invention, by performing the air-fuel ratio control based on the air flow meter output even during the scavenge control, the exhaust gas air-fuel ratio can have the value suitable to the control target air-fuel ratio, seen from the catalyst downstream of the exhaust port. As for the blow-by air amount, a lean gas flows into the catalyst. On the other hand, combustion can be performed with an air-fuel ratio which is rich correspondingly to the amount of the blow-by air, and the cylinder air-fuel ratio can be brought close to the output air-fuel ratio. As a result, while the engine output improvement effect by shift to the output air-fuel ratio side and the like is enjoyed, the exhaust gas air-fuel ratio to the catalyst can be kept in the vicinity of the control target air-fuel ratio in average. Accordingly, during scavenge control, improvement in output performance and restraint of worsening of emission can be made compatible.

According to the sixth aspect of the present invention, when the air-fuel ratio feedback control in the scavenge establishment region is already carried out at a time of use of the scavenge valve open characteristic corresponding to the operation request, the valve open characteristic can be switched to the scavenge valve open characteristic. This is because it is determined that a chance to perform learning about the information relating to the air-fuel ratio control is already obtained. Conversely, when the air-fuel ratio feedback control in the scavenge establishment region is not carried out yet, the chance to learn is not obtained yet, and therefore, switch to the scavenge valve open characteristic is not performed. Thereby, it can be determined whether the scavenge valve open characteristic in the variable valve gear is usable or not, based on the history of the air-fuel ratio feedback control.

BRIEF DESCRIPTION OF DRAWINGS

FIG. 1 is a diagram schematically showing a configuration of an internal combustion engine according to an embodiment of the present invention.

FIG. 3 is a diagram showing a learning value map which an ECU stores in a contained RAM, in the embodiment of the present invention.

DESCRIPTION OF EMBODIMENT

Embodiment

[Configuration of Device of Embodiment]

Figure 2A:
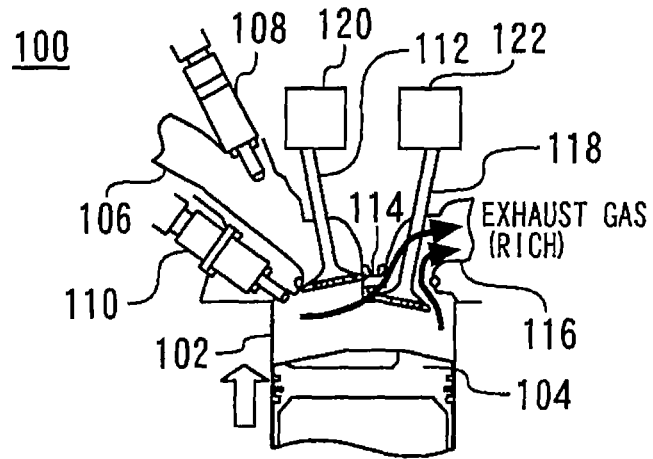
FIGS. 2A, 2B, and 2C are diagrams each schematically showing a configuration of an internal combustion engine according to an embodiment of the present invention.

FIG. 1 and FIGS. 2A, 2B, and 2C are diagrams each schematically showing a configuration of an internal combustion engine according to an embodiment of the present invention. The internal combustion engine according to the present embodiment includes a cylinder block 10. The cylinder block 10 is an inline four-cylinder type turbocharged gasoline engine including cylinder No. 1 to cylinder No. 4 (described as "#1 to #4" for convenience in FIG. 1). Cylinders No. 1 to cylinder No. 4 each include a configuration of a cylinder 100 shown in FIGS. 2A, 2B, and 2C.

Intake ports of the respective cylinders of the cylinder block 10 communicate with an intake manifold 12. The intake manifold 12 communicates with an intake passage 20 via a throttle 14. An intake pressure sensor 15 is mounted to the intake passage 20. The intake passage 20 is connected to an intercooler 16, and the intercooler 16 is connected to an intake passage 22. A compressor 62 of a turbocharger 60 is interposed between the intake passage 22 and an intake passage 24. An air flow meter 17 and an air cleaner 18 are provided upstream of the intake passage 24.

Exhaust ports of the respective cylinders of the cylinder block 10 communicate with an exhaust manifold 30. The exhaust manifold 30 communicates with a turbine 64 of the turbocharger 60, and an exhaust pipe 32 is connected downstream thereof. The exhaust pipe 32 communicates with a catalyst 34, and a downstream side of the catalyst 34 is further connected to an exhaust pipe 36. The exhaust pipe 36 is a three-way catalyst that can simultaneously purify CO, HC and Nox. An A/F sensor 38 is mounted to the exhaust pipe 32. The A/F sensor 38 is a sensor that issues a substantially linear output with respect to an air-fuel ratio A/F of an exhaust gas that flows into the catalyst 34.

The internal combustion engine according to the present embodiment includes a LPL (Low Pressure Loop)-EGR device and a HPL (High Pressure Loop)-EGR device. Explaining the LPL-EGR device, one end of a LPL-EGR passage 40 is connected to the exhaust pipe 36, and the other end of the LPL-EGR passage 40 is connected to the intake passage 24 via an EGR valve 42. Explaining the HPL-EGR device, one end of an HPL-EGR passage 44 is connected to the exhaust manifold 30, and the HPL-EGR passage 44 is connected to the intake manifold 12 via an EGR cooler 46 and an EGR valve 48.

One end of a bypass passage 66 is connected to the intake passage 22, and the other end of the bypass passage 66 is connected to the intake passage 24. The bypass passage 66 is provided with an air bypass valve 68. The exhaust manifold 30 and the exhaust pipe 32 are connected via a waste gate valve 70.

Figure 2B:
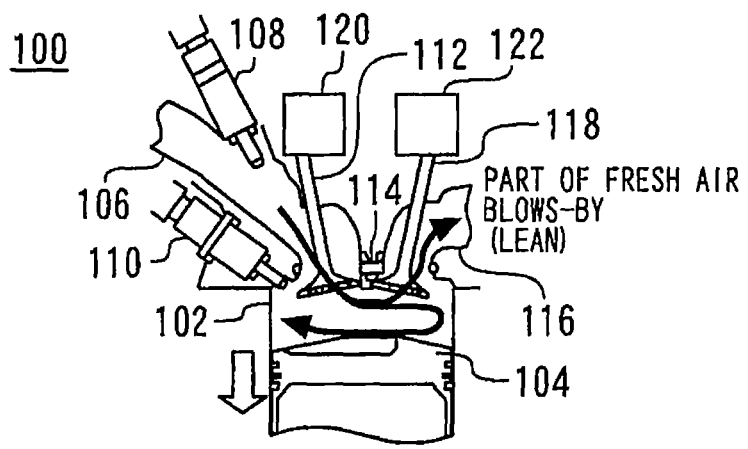
Figure 2C:
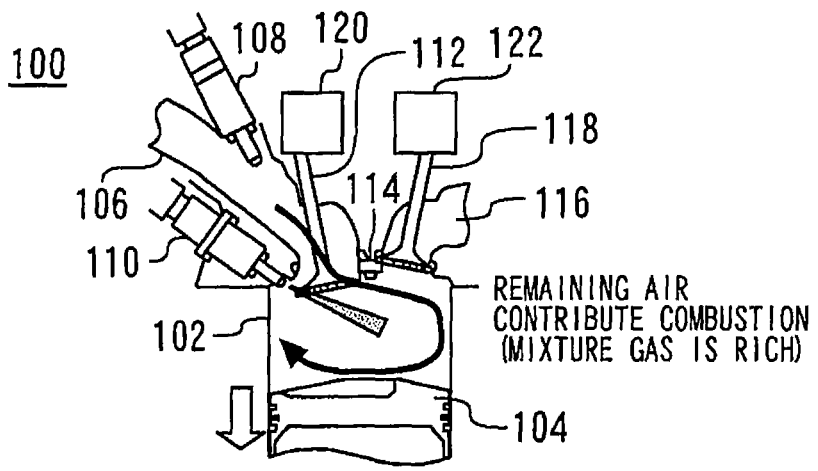

As shown in FIGS. 2A, 2B and 2C, various components are incorporated into each of the cylinders 100 which are formed in the cylinder block 10. In a space enclosed by a cylinder inner wall 102, a piston 104 is disposed to be capable of reciprocal movement. A cylinder head that is integrated with the cylinder block 10 is provided with an intake port 106 and an exhaust port 116. The intake port 106 is provided with a port injection valve 108, and further includes an cylinder injection valve 110. These injection valves are both electromagnetic valves, and are capable of being electronically controlled by an ECU (Electronic Control Unit) 80.

An intake valve 112 that opens and closes the intake port 106 can change a phase angle thereof by an intake VVT device 120. An exhaust valve 118 that opens and closes the exhaust port 116 also can change a phase angle thereof by an exhaust VVT device 122. Since the phase angles are variable, in the intake valve 112 and the exhaust valve 118, a valve overlap amount for bringing both the intake valve 112 and the exhaust valve 118 into an open state by overlapping valve open time periods, and the valve overlap amount thereof is adjustable.

The internal combustion engine according to the present embodiment includes the ECU 80 for engine control. The ECU 80 contains various components such as a CPU that carries out arithmetic operation processing, storage devices such as a ROM and RAM, and input and output interfaces, though not illustrated.

To an input section (an input interface) of the ECU 80, an output from the intake pressure sensor 15, an output from the air flow meter 17, an output from an engine speed sensor (not illustrated) and an output from the A/F sensor 38 are supplied. The intake pressure sensor 15 is a sensor that detects an intake pressure in the intake passage 20, and can detect a turbocharging pressure during an operation of the turbocharger 60. The air flow meter 17 is a sensor that detects an intake air amount Ga of the internal combustion engine. The engine speed sensor is a sensor that issues an output corresponding to an engine speed Ne. To the input section (the input interface) of the ECU 80, an accelerator opening degree sensor 82 that detects an opening degree of an accelerator pedal (not illustrated), and various other sensors (an engine water temperature sensor, a cam angle sensor and the like, in accordance with necessity) not illustrated are connected.

An output section (an output interface) of the ECU 80 is connected to the port injection valve 108 and the cylinder injection valve 110 which are both electromagnetic valves, and can supply a signal Inj for performing electronic control based on respective fuel injection amounts and injection timings to these electromagnetic valves. Further, the output section of the ECU 80 is connected to respective actuators of the intake VVT device 120 and the exhaust VVT device 122, and can give control signals VVTin and VVTex corresponding to operation conditions in accordance with a control program contained in the ECU 80 to these actuators. Thereby, the phase angle, the valve open time period, the valve overlap amount and the like can be adjusted to desired amounts with respect to each of the intake valve 112 and the exhaust valve 118.

To the output section of the ECU 80, the throttle 14, the EGR valve 42, the EGR valve 48, an ignition plug 114, and an air bypass valve 68 are connected in addition, and the output section of the ECU 80 can supply control signals thereto. Thereby, control from the ECU 80 is performed with respect to a throttle opening degree TA, an EGR amount, an ignition timing SA, and opening and closing of the air bypass valve 68.

The ECU 80 stores a program for engine operation control in the storage devices contained therein. The ECU 80 detects operation information about the engine from a sensor system, and performs operation control by driving the respective actuators based on the detection results. More specifically, a driver operates the accelerator pedal, whereby an operation amount thereof is detected by the accelerator opening degree sensor 82, and is inputted to the ECU 80. Based on the input value thereof, a request load is calculated, and the ECU 80 calculates the proper throttle opening degree TA after including the request load in the calculation, and gives a control signal to the throttle 14 to realize the throttle opening degree TA. The ECU 80 detects the engine speed Ne and a crank angle CA based on an output from a crank angle sensor (not illustrated), and calculates the intake air amount Ga from the air flow meter 17. Further, the ECU 80 calculates a load kl (a load factor) of the engine based on the intake air amount Ga, the engine speed Ne and the like. The ECU 80 calculates a fuel injection timing and the ignition timing SA based on the crank angle CA, and when these timings arrive, the ECU 80 outputs control signals (drive signals) for driving the port injection valve 108, the cylinder injection valve 110 and the ignition plug 114. Thereby, a mixture gas is combusted in the cylinders, and the engine can be operated.

Furthermore, the ECU 80 also stores a program for carrying out air-fuel ratio feedback control that will be described later. A program for storing learning values as a result of performing stoichiometric point learning in the air-fuel ratio feedback control and the like in RAM are included therein.

[Air-Fuel Ratio Feedback Control of Device of Embodiment]

A device of the present embodiment executes the air-fuel ratio feedback control based on the output from the A/F sensor 38. More specifically, the air-fuel ratio feedback control executes processing of the following (a) and (b). Note that in the following explanation, the air-fuel ratio A/F of an exhaust gas that is discharged from the internal combustion engine will be also called as "an exhaust A/F".

(a) Corrected A/F Output Calculation Processing

Corrected A/F output calculation processing is processing of calculating a corrected A/F output evabyf based on an output evafbse from the A/F sensor 38.

The A/F sensor 38 is produced as the sensor that issues a substantially linear output with respect to the exhaust A/F, as already described. When the sensor indicates ideal characteristics, a unique relationship is established between the output evafbse thereof and the exhaust A/F. In this case, the output evabyf from the A/F sensor 38 can be used as a substitute value of the exhaust A/F. However, on the output evafbse from the A/F sensor 38, an influence due to a variation of the sensor itself, a variation of a signal transmission system such as a wire harness and the like is superimposed. Therefore, a unique relationship is not always established between the output evafbse from the A/F sensor 38 detected by the ECU 80 and the exhaust A/F.

Consequently, the ECU 80 applies proper correction to the output evafbse from the A/F sensor 38, and generates the corrected A/F output evabyf which has a meaning as an idealistic output that should be issued by the A/F sensor 38. If the corrected A/F output evabyf is an idealistic output that should be issued by the A/F sensor 38, a unique relationship is established between the corrected A/F output evabyf and the exhaust A/F. In this case, the corrected A/F output evabyf can be dealt as the substitute value of the exhaust A/F.

The ECU 80 adds a stoichiometry learning amount evafofs to the output evafbse from the A/F sensor 38 in calculating the corrected A/F output evabyf. According to the processing like this, a constant error due to the variations of the wire harness and the like can be eliminated from the corrected A/F output evabyf.

More specifically, acquisition of the stoichiometry learning amount evafofs is realized by cooperation of an FB correction amount learning section and a learning value storing section. The FB correction amount learning section executes processing for acquiring a plurality of correction amounts of feedback correction that will be described later and learning an average value. The learning value storing section is a storage region that is provided to a predetermined region in the RAM in the ECU 80 in a form of a map for storing the learning value obtained in the FB correction amount learning section, for each intake air amount. In the present embodiment, the FB correction amount learning section and the learning value storing section are implemented in the ECU 80 as software functions.

FIG. 3 is a diagram showing a learning value map which the ECU 80 stores in the contained RAM, in the embodiment of the present invention. In calculation of the corrected A/F output evabyf, correction based on the stoichiometric point learning is performed for the output evafbse from the A/F sensor 38. The stoichiometric point learning is performed to correct the influence which the variation in the wire harness and the like exert on the output from the A/F sensor 38. More specifically, the FB correction amount learning section executes processing of obtaining an average value of feedback correction amounts at a time of feedback control in (b) fuel injection amount control processing described as follows, and storing the average value as a learning value b for each of the intake air amounts Ga. As a result, a constant error amount that is superimposed on the output evafbse from the A/F sensor 38 which the ECU 80 recognizes is learned.

The constant error amount which is regarded as problematic here hinders calculation of the feedback correction amount with a control target air-fuel ratio (stoichiometry in the present embodiment) as a center (basis) in performing (b) fuel injection amount control processing as follows. Consequently, in the present embodiment, as described above, in calculation of the corrected A/F output evabyf, a stoichiometry learning amount evafofs is added to the output evafbse from the A/F sensor 38. Thereby, the constant error amount is excluded, and stoichiometry as a center point (a reference point) of calculation of the feedback correction amount can be accurately grasped.

Figure 4:
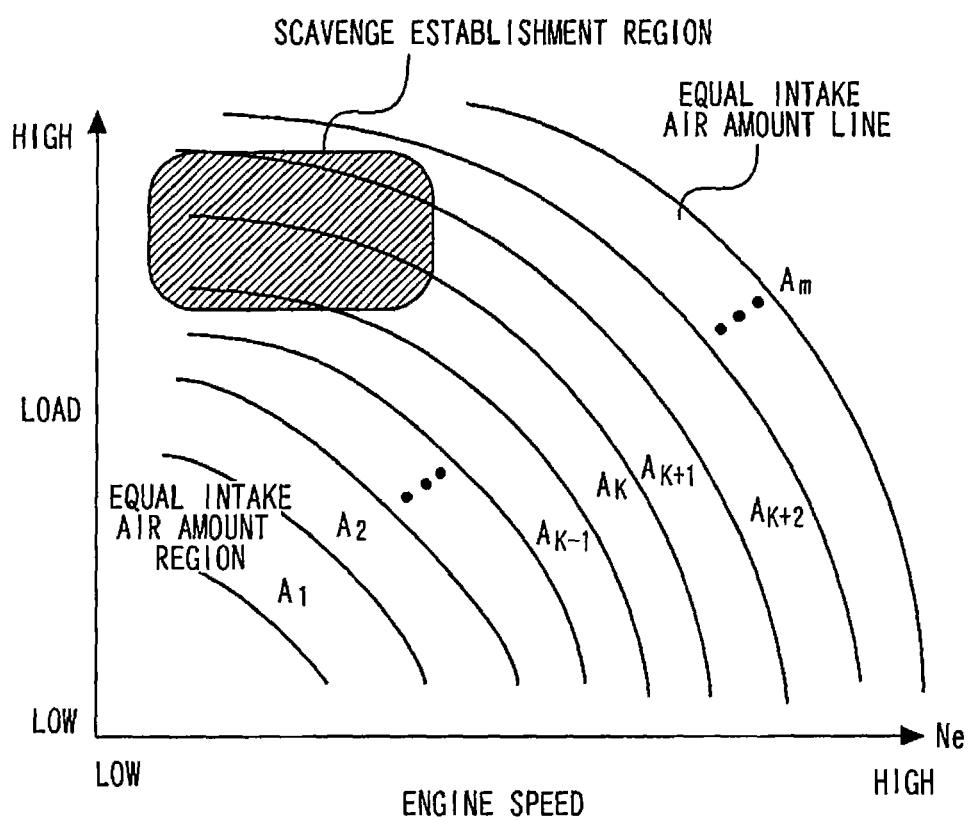
FIG. 4 is a schematic diagram showing a state in which an equal intake air amount is divided at constant intervals on the operation region, in the embodiment of the present invention.

The FB correction amount learning section of the ECU 80 stores the learning value b for each of the intake air amounts Ga to the learning value storing section (more specifically, in the predetermined storage region which is provided in the form of the map). The ECU 80 stores a plurality of equal intake air amount regions $A_1, A_2, A_3, \ldots, A_{k-1}, A_k, A_{k+1}, A_{k+2} \ldots, A_m$ that are set in advance. FIG. 4 is a schematic diagram showing a state in which an equal intake air amount is divided at constant intervals on the operation region, in the embodiment of the present invention. The learning value is stored and updated one by one at each of the equal intake air amount regions. As a result, for the plurality of equal intake air amount regions $A_1, A_2, A_3, \ldots, A_{k-1}, A_k, A_{k+1}, A_{k+2}, \ldots, A_m$, learning values $b_1, b_2, b_3, \ldots, b_{k-1}, b_k, b_{k+1}, b_{k+2}, \ldots, b_m$ are stored.

The ECU 80 first executes a determination routine of determining to which of A1 to Am the region where the intake air amount Ga of the air flow meter 17 belongs at a time of carrying out feedback correction of this time belongs. For example, when the region belongs to $A_k$, the ECU 80 reads the learning value $b_k$ corresponding to this, assigning the learning value $b_k$ to the stoichiometry learning amount evafofs, and adding the stoichiometry learning amount evafofs to the output evafbse to execute processing of calculating the corrected A/F output evabyf. Thereby, the proper corrected A/F output evabyf can be calculated in accordance with the value of the intake air amount Ga.

Note that FIG. 4 is a schematic diagram, and how to divide the equal intake air amount (a width of division, the number of regions, and the like) can be properly set in accordance with the machine of the actual internal combustion engine.

(b) Fuel Injection Amount Control Processing

The ECU 80 carries out fuel injection amount control processing of correcting a fuel injection amount based on an output from the air-fuel ratio sensor so that the air-fuel ratio of an exhaust gas corresponds to the control target air-fuel ratio. In more detail, the fuel injection amount control processing is processing of controlling a fuel injection amount so that the exhaust A/F actually corresponds to a control target A/F based on the corrected A/F output evabyf.

When the exhaust A/F which is estimated based on the corrected A/F output evabyf is larger than the control target A/F, it can be determined that the exhaust A/F is lean. In this case, theoretically, in the feedback control executed by the ECU 80, the fuel injection amount is increased correspondingly to a control amount which is obtained by multiplying a difference between the exhaust A/F and the control target A/F by a predetermined rich side gain. As a result, the exhaust A/F changes to a rich side and is brought close to the control target A/f.

Meanwhile, when the exhaust A/F which is estimated based on the corrected A/F output evabyf is smaller than the control target A/F, it is determined that the exhaust A/F is rich. In this case, theoretically, in the feedback control which is executed by the ECU 80, the fuel injection amount is decreased correspondingly to the control amount which is calculated by multiplying the difference between the exhaust A/F and the control target A/F by a predetermined lean side gain. As a result, the exhaust A/F changes to a rich side to be brought close to the control target A/F. The ECU 80 controls the exhaust A/F to a neighborhood of the control target A/F in this manner.

The control amounts which are obtained by multiplying the lean side gain or the rich side gain correspond to the "correction amount" of feedback correction. The FB correction amount learning section takes in the average value of the correction amounts as a learning value. As a result, as shown in FIG. 3, the map storing the learning value for each of the equal intake air amount regions is obtained, and is updated during an operation of the internal combustion engine. The specific content of the processing where the learning value is used is as already described in "(a) Corrected A/F output calculation processing" described above.

[Scavenge Control and Specific Processing Executed by ECU in Device of Embodiment]

(Problem Arising from Scavenge)

With use of FIGS. 2A, 2B and 2C, a state in which blow-by (i.e. scavenge) of the intake air occurs in the internal combustion engine according to the present embodiment and an influence thereof will be described. FIG. 2A is a view showing an exhaust stroke. FIG. 2B is a view showing a state during valve overlap in an intake stroke. FIG. 2C is a view showing a state at a fuel injection time after the exhaust valve 118 is closed in the intake stroke.

A rich exhaust gas is assumed to flow out into the exhaust passage as in FIG. 2A after combustion. Thereafter, the intake stroke is brought about as in FIG. 2B, and at this time, a part of the fresh air which blows through the cylinder due to valve overlap is lean. Next, the air which does not blow through the cylinder remains in the cylinder as in FIG. 2C, fuel injection is performed to the air in the cylinder, and combustion is performed.

The control target air-fuel ratio is assumed to be set at stoichiometry with respect to the intake air amount based on the air flow meter, for example. However, under the situation where blow-by of the fresh air occurs, combustion takes place in a state where air is insufficient by the amount of the air which is blown through the cylinder, and therefore, the exhaust gas becomes rich. As a result, the air-fuel ratio of the exhaust gas which flows out into the exhaust port repeats becoming lean and rich in such a manner that the air-fuel ratio becomes rich, lean, and rich. When the A/F sensor 38 senses the exhaust gas like this, the output is hunting, and accurate air-fuel ratio feedback control cannot be carried out. Even if the cylinder air-fuel ratio is controlled to be stoichiometory, a part of the fresh air blows through the cylinder, and a lean output repeatedly appears similarly.

(Use of Learning Value of Air-Fuel Ratio Feedback Control)

In order to prevent the problem of hunting of the A/F sensor 38 as above, and to restrain degradation of emission characteristics, the device according to the present embodiment carries out the following control. The air-fuel ratio control which the ECU 80 carries out in the present embodiment causes the air-fuel ratio control to differ during execution of scavenge control and during execution of non-scavenge control.

The "scavenge control" refers to control that causes the intake VVT device 120 and the exhaust VVT device 122 to operate with a scavenge valve open characteristic. The "scavenge valve open characteristic" refers to a valve open characteristic provided with a valve overlap amount of such a degree that blow-by of the intake air occurs in the intake stroke during an operation of the turbocharger 60. The scavenge valve open characteristic is realized by adjustment of the respective phase angles by the intake VVT device 120 and exhaust VVT device 122 in the present embodiment.

Meanwhile, the "non-scavenge control" means "control that is not scavenge control". Namely, the non-scavenge control refers to control of causing the intake VVT device 120 and the exhaust VVT device 122 to operate with a valve open characteristic that is not the scavenge valve open characteristic. According to the non-scavenge control, an operation without causing blow-by of the fresh air is enabled.

In the present embodiment, the ECU 80 executes processing of carrying out the air-fuel ratio control by selectively using the learning value b corresponding to the intake air amount Ga, from the learning values learned during an operation of the internal combustion engine in an "non-scavenge control time period". For example, if the intake air amount Ga belongs to $A_k$ of the map in FIG. 3, the air-fuel ratio control is performed by using the learning value $b_k$ during the scavenge control.

FIG. 3 is an example of the map storing the learning values of feedback correction amounts (also called feedback request amounts) which the ECU 80 includes in the embodiment of the present invention. FIG. 4 is the schematic diagram showing an example of the region divisions of the equal intake air amount according to the embodiment as described above. As in FIG. 3, in the present embodiment, the plurality of equal intake air amount regions $A_1$, $A_2$, $A_3$, ..., $A_{k-1}$, $A_k$, $A_{k+1}$, $A_{k+2}$, ..., $A_m$ are set. It is assumed herein that for each of the equal intake air amount regions, one learning amount b is stored. The "equal intake air amount region" means the operation region where the fresh air amount detected from the output from the air flow meter 17 becomes equal. For example, in the present embodiment, in the region A1, the fresh air amount detected from the output from the air flow meter 17 is assumed to be equal. Likewise, in the region $A_k$, the fresh air amount detected from the output from the air flow meter 17 is assumed to be equal.

With respect to the equal intake air amount regions in which the learning history is "present" in FIG. 3, learning is already performed, and with respect to the equal intake air amount region with "absent", learning is not performed yet. Note that in the column of the learning history, a value of 0 or 1 may be held in accordance with presence or absence of the learning history, for example, in order to play a role of a flag.

FIG. 4 schematically shows a scavenge establishment region in the internal combustion engine according to the present embodiment. The "scavenge establishment region" refers to a region that satisfies conditions which enable scavenge control, and is an operation region that is set in advance for each internal combustion engine. Further, "the scavenge control is enabled" means conditions for blow-by of the fresh air to occur when the valve overlap amount is made a predetermined amount. For example, the condition of whether or not an operation region belongs to a predetermined operation region on an operation region fixed by the load kl and the engine speed Ne, and various conditions such as whether or not the turbocharging pressure becomes as high as or higher than a predetermined value by an operation of the turbocharger 60 and the like are assumed. Detection of the turbocharging pressure can be performed based on the output value of the intake pressure sensor 15. As is understood from FIG. 4, the scavenge establishment region according to the present embodiment partially overlaps the equal intake air amount regions $A_{k-1}$, $A_k$, $A_{k+1}$ and $A_{k+2}$.

Note that the scavenge region shown in FIG. 4 is an example shown in the present embodiment, and the present invention is not limited to this. Due to a difference in machine and the like, the scavenge establishment regions can differ according to individual internal combustion engines.

In the present embodiment, when the ECU 80 executes scavenge control, the ECU 80 selects the learning values $b_{k-1}$, $b_k$, $b_{k+1}$ or $b_{k+2}$ in accordance with the load kl, and executes air-fuel ratio control. Note that the ECU 80 may stop stoichiometric point learning (processing of the FB correction amount learning section) about the learning values $b_{k-1}$, $b_k$, $b_{k+1}$ and $b_{k+2}$ during execution of the scavenge control. Thereby, feedback control and learning based on the air-fuel ratio sensor output are not carried out during scavenge control.

According to the present embodiment described above, the learning values which are obtained during non-scavenge control are used during scavenge control, and therefore, use of unstable learning values under the environment where the output from the A/F sensor 38 is likely to be hunting can be avoided. Namely, in the time period in which blow-by of the intake air occurs, the blow-by air hits the air-fuel ratio sensor, whereby an abrupt lean output vibration is included in the sensor output. Therefore, air-fuel ratio control relaying on the air-fuel ratio sensor becomes difficult. Even during the scavenge control like this, according to the present embodiment, the learning values which are already acquired during the non-scavenge control can be used in the air-fuel ratio control during scavenge control, and therefore reduction in air-fuel ratio controllability can be restrained.

Note that learning of each of $b_{k-1}$, $b_k$, $b_{k+1}$ and $b_{k+2}$ is completed by the aforementioned air-fuel ratio feedback control and stoichiometric point learning being carried out in each of the operation regions (loads and engine speeds) which belong to the equal intake air amount regions $A_{k-1}$, $A_k$, $A_{k+1}$ or $A_{k+2}$ in FIG. 4. Namely, in order that learning of each of $b_{k-1}$, $b_k$, $b_{k+1}$ and $b_{k+2}$ is performed, the following two kinds of cases roughly classified are estimated.

A first case is a case in which in the scavenge establishing region, with the valve open characteristic without provided with the valve overlap, an operation of the internal combustion engine is performed, and the air-fuel ratio feedback control and the stoichiometric point learning are carried out.

A second case is a case in which an operation of the internal combustion engine is performed, and the air-fuel ratio feedback control and the stoichiometric point learning are carried out, in an operation region (a load and an engine speed) which is outside the scavenge establishment region, and belongs to any one of the equal intake air amount regions $A_{k-1}$, $A_k$, $A_{k+1}$ or $A_{k+2}$.

(Control of Intake VVT Device 120 and Exhaust VVT Device 122)

FIG. 4 schematically illustrates the scavenge establishment region set as a predetermined operation region. When an operation request under the load belonging to the scavenge establishment region arises, if learning of the respective learning values $b_{k-1}$, $b_k$, $b_{k+1}$ and $b_{k+2}$ about the equal intake air amount regions $A_{k-1}$, $A_k$, $A_{k+1}$ or $A_{k+2}$ is already completed, the learning values can be used in air-fuel ratio control. However, at a timing of carrying out scavenge control, the values of some or all of the learning values $b_{k-1}$, $b_k$, $b_{k+1}$ and $b_{k+2}$ are not stored yet in the map in FIG. 3, or do not become the newest values suitable to the present state in some cases. More specifically, at a timing before an operation of the internal combustion engine is performed in some or all of the equal intake air amount regions $A_{k-1}$, $A_k$, $A_{k+1}$ or $A_{k+2}$, after start of the internal combustion engine, an operation request under the load belonging to the scavenge establishment region can be made. In this case, with respect to some or all of the learning values $b_{k-1}$, $b_k$, $b_{k+1}$ and $b_{k+2}$, the scavenge control cannot be carried out by using the values in air-fuel ratio control.

Consequently, in the present embodiment, when an operation request to carry out scavenge control arises, the valve open characteristic is switched to the scavenge valve open characteristic after whether or not the learning value desired to be used is already learned is accurately confirmed. That is to say, when the operation request to carry out scavenge control arises, the ECU 80 does not carry out scavenge control when the necessary learning value (the value desired to be used in the control of this time out of the learning values $b_{k-1}$, $b_k$, $b_{k+1}$ and $b_{k+2}$ in the case of the present embodiment) in the learning value storage section of the ECU 80 is not present, namely, the learning history of the learning value is "absent". Subsequently, when the necessary learning value is already acquired as a result of the subsequent operation and learning advancing, if an operation request to carry out scavenge control arises, scavenge control is carried out in response to this. Thereby, reduction in air-fuel ratio controllability can be reliably restrained.

Figure 5A:
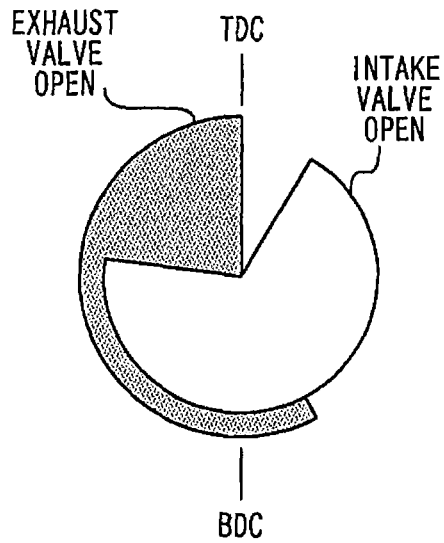
FIGS. 5A and 5B show views showing the scavenge valve open characteristic (FIG. 5B) in the embodiment of the present invention, and a non-scavenge valve open characteristic (FIG. 5A).
Figure 5B:
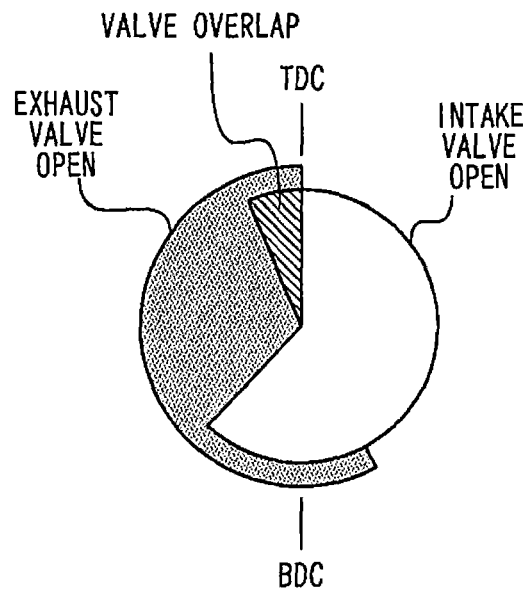

FIGS. 5A and 5B show views showing the scavenge valve open characteristic (FIG. 5B) in the embodiment of the present invention, and a non-scavenge valve open characteristic (FIG. 5A). The scavenge valve open characteristic is provided with a valve overlap amount, whereas the non-scavenge valve open characteristic does not have a valve overlap amount. The ECU 80 determines whether an operation request under the load belonging to the scavenge establishment region arises during an operation of the turbocharger 60, based on the output signal from the accelerator opening degree sensor 82. When the learning value about the intake air amount corresponding to the request load is present in the learning value storing section in the ECU 80, the intake VVT device 120 and the exhaust VVT device 122 are operated with the scavenge valve open characteristic (FIG. 5B), and scavenge control is carried out. Meanwhile when the learning value about the intake air amount corresponding to the request load is not present in the learning value storing section, the intake VVT device 120 and the exhaust VVT device 122 are operated with the valve open characteristic (FIG. 5A) with which blow-by of the fresh air does not occur.

Note that at a time of scavenge control corresponding to the operation request, whether or not to switch to the scavenge valve open characteristic may be determined based on whether or not the air-fuel ratio feedback control in the scavenge establishment region has been already carried out. Namely, when the air-fuel ratio feedback control in the scavenge establishment region is not carried out yet, switch to the scavenge valve open characteristic may be prohibited. Thereby, it can be appropriately determined whether the scavenge valve open characteristic in the intake VVT device 120 and the exhaust VVT device 122 is usable, based on the history of the air-fuel ratio feedback control.

(Leveling Processing)

Figure 6:
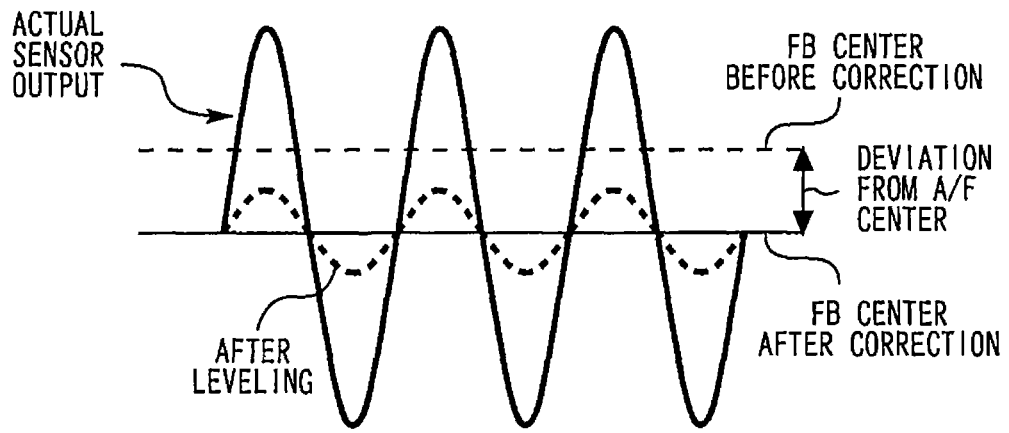
FIG. 6 is a diagram for explaining a state in which air-fuel ratio feedback control is carried out during scavenge control in the internal combustion engine according to the embodiment of the present invention.

FIG. 6 is a diagram for explaining a state in which air-fuel ratio feedback control is carried out during scavenge control in the internal combustion engine according to the embodiment of the present invention. As shown in FIG. 6, during scavenge control, the actual sensor output significantly changes between lean and rich. In this case, due to deviation from an A/F center and the like, controllability of the air-fuel ratio feedback control is significantly impaired.

Consequently, in the present embodiment, the ECU 80 executes "leveling processing" during scavenge control. The "leveling processing" refers to processing of smoothing the output signal from the A/F sensor 38 in a time direction. In the air-fuel ratio feedback control during scavenge control, the ECU 80 precisely determines a corrected FB center (i.e. a stoichiometric point) by using the learning values $b_{k-1}$, $b_k$, $b_{k+1}$ and $b_{k+2}$, respectively, and further performs feedback correction of the fuel injection amount based on the signal which is smoothed in a leveling processing section (i.e. the broken line in FIG. 6). Thereby, during scavenge control, the air-fuel ratio feedback control also can be continued without excessively impairing controllability.

(Securing of Emission Characteristic and Improvement in Engine Output)

Figure 7:
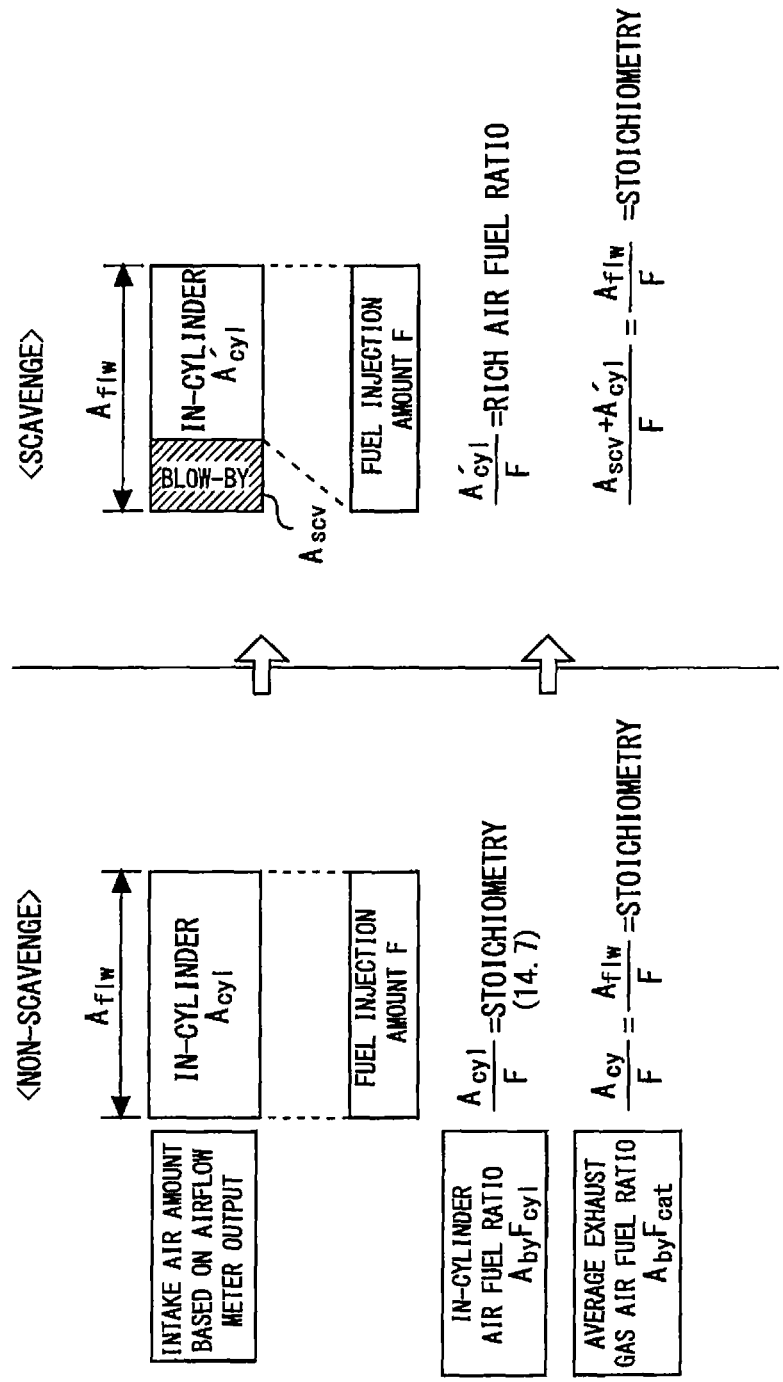
FIG. 7 is a schematic diagram for explaining a mechanism which realizes securing of an emission characteristic and improvement in output with the output air-fuel ratio in the internal combustion engine according to the present invention.

FIG. 7 is a schematic diagram for explaining a mechanism which realizes securing of an emission characteristic and improvement in output with the output air-fuel ratio in the internal combustion engine according to the present invention. At the time of scavenge, increase in the turbocharging pressure, scavenge of the cylinder remaining gas, and improvement in the engine output by the cylinder air-fuel ratio being rich can be expected. By bringing the cylinder air-fuel ratio close to the output air-fuel ratio, engine output power can be enhanced.

FIG. 7 illustrates the intake air amount based on the air flow meter 17 as Aflw. In the present embodiment, the ECU 80 calculates a fuel injection amount F based on Aflw during a non-scavenge operation (namely, a case without blow-by of the fresh air) at the left side in FIG. 7. When the cylinder air amount is set as Acyl, Aflw and Acyl precisely correspond to each other because there is no blow-by of the fresh air during a non-scavenge operation, and therefore, an exhaust gas air-fuel ratio AbyFcat can be made to correspond to stoichiometry precisely.

Meanwhile, during the scavenge operation at the right side in FIG. 7, out of Aflow, a part of the fresh air becomes blow-by air Ascv, and the remaining air becomes a cylinder air amount A'cyl. By occurrence of blow-by, an advantage at the time of scavenge such as scavenging of the cylinder remaining gas can be enjoyed. In the present embodiment, the ECU 80 also calculates the fuel injection amount. F based on the intake air amount Aflw based on the air flow meter 17 during the scavenge operation. Thereby, a cylinder air-fuel ratio AbyFcyl during scavenge operation becomes A'cyl/F, as a result of which, air becomes insufficient, and combustion with a rich air-fuel ratio (preferably, a value close to the output air fuel ratio A/F=12) is performed. As a result, the engine output can be improved. Further, the air-fuel ratio of the exhaust gas which flows into the catalyst 34 is the exhaust gas air-fuel ratio AbyFcat, as an average value. The lean blow-by air Ascv and the rich exhaust gas flow in, whereby the value of Aflw/F becomes stoichiometric in average, and therefore, a favorable emission characteristic also can be secured.

As described above, according to the present embodiment, air-fuel ratio control based on the output from the air flow meter 17 is also performed during scavenge control, whereby the average exhaust gas air-fuel ratio AbyFcat can be a value suitable to the control target air-fuel ratio (stoichiometry), seen from the catalyst 34 downstream of the exhaust port 116. As for the amount of the blow-by air Ascv, a lean gas flows into the catalyst 34. On the other hand, combustion can be performed at a rich air-fuel ratio by the amount of the blow-by air Ascv, and the cylinder air-fuel ratio AbyFcyl can be brought close to the output air-fuel ratio. As a result, while the engine output improvement effect by shift to the output air-fuel ratio side and the like is enjoyed, the exhaust gas air-fuel ratio to the catalyst 34 can be kept in the vicinity of stoichiometry in average. Accordingly, during scavenge control, output performance improvement and restraint of worsening of emission can be made compatible.

[Specific Processing Executed by ECU in Embodiment]

Figure 8:
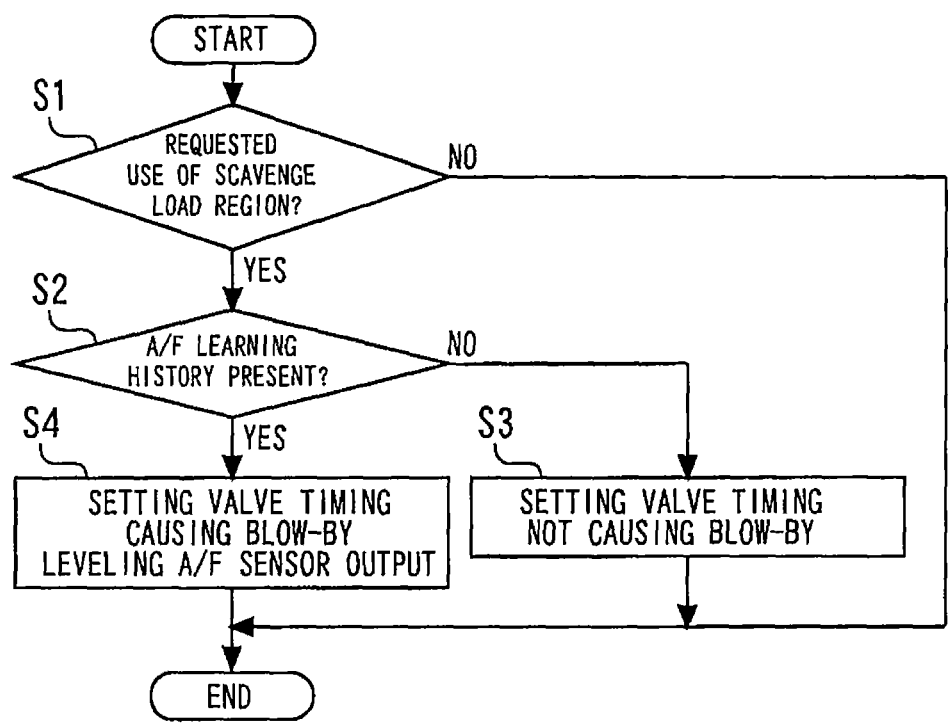
FIG. 8 is a flowchart of a routine that is executed by an ECU in the embodiment of the present invention.

FIG. 8 is a flowchart of a routine that is executed by the ECU 80 in the embodiment of the present invention. The routine in FIG. 8 is repeatedly executed at predetermined periods during execution of the internal combustion engine according to the present embodiment.

In the routine in FIG. 8, the ECU 80 firstly executes processing of determining whether or not a use request of the scavenge load region is present (step S1). The processing of the step is processing of calculating a request load based on the output signal from the accelerator opening degree sensor 82 first, and subsequently determining whether an operation request under a load which is the request load belonging to the scavenge establishment region during an operation of the turbocharger 60 is present. More specifically, it can be determined whether or not the request load is equal to or larger than a predetermined load, and whether or not the engine speed Ne obtained from the crank angle sensor output is equal to or lower than a predetermined engine speed. The value of the turbocharging pressure detected by the intake pressure sensor 15 may be included in the determination processing. It can be determined whether or not the request operation condition belongs to the inside of the scavenge establishment region in FIG. 4. When the condition of this step is not established, the routine of this time is ended.

When the condition in step S1 is established, the ECU 80 executes the processing for determining whether or not the A/F learning history is present (step S2). More specifically, in this step, it is confirmed whether the learning history of the learning value $b_k$ is present if the request load belongs to the region $A_k$, for example, and it is configured whether or not the learning history is present with respect to $b_{k+1}$ if the request load belongs to the region $A_{k+1}$, for example, in the map schematically shown in FIG. 3.

When learning history is not present in the determination processing in step S2, the processing shifts to step S3. In step S3, the ECU 80 executes processing of setting the valve timing at a valve timing at which blow-by of fresh air does not occur. Namely, the ECU 80 supplies control signals to the respective actuators of the intake VVT device 120 and the exhaust VVT device 122 so that the intake valve 112 and the exhaust valve 118 drive at phase angles that realize the non-scavenge valve open characteristics in FIG. 5A. Thereafter, the routine of this time is ended, and the air-fuel ratio feedback control and learning are carried out in this state.

In the determination processing in step S2, the processing shifts to step S4 when the learning history is present. In step S4, the ECU 80 executes processing of setting the valve timing at a valve timing at which blow-by of the fresh air occurs. Namely, the ECU 80 supplies control signals to the respective actuators of the intake VVT device 120 and the exhaust VVT device 122 so that the intake valve 112 and the exhaust valve 118 drive at the phase angles that realize the scavenge valve open characteristics in FIG. 5B.

As above, in the routine of steps S2, S3 and S4, the control operation described in the above described "control of the intake VVT device 120 and the exhaust VVT device 122" is carried out.

With the start of scavenge control, the learning values $b_{k-1}$, $b_k$, $b_{k+1}$ and $b_{k+2}$ are used in the air-fuel ratio feedback control in the ECU 80, as described in the above described "Use of learning value of air-fuel ratio feedback control". During scavenge control, stoichiometric point learning and the like may be stopped.

In step S4, the ECU 80 further executes leveling processing of the A/F sensor output. More specifically, as in the explanation content of the above described "Leveling processing" described with use of FIG. 6, the processing of smoothing the output signal from the A/F sensor 38 in a time direction is executed.

Thereafter, the routine of the time is ended, and in this state, the air-fuel ratio feedback control is carried out. Namely, based on the output signal from the A/F sensor 38 after leveling processing, with use of each of the learning values $b_{k-1}$, $b_k$, $b_{k+1}$ and $b_{k+2}$, (a) corrected A/F output calculation processing and (b) fuel injection amount control processing are executed. Further, fuel injection amount calculation based on the output from the air flow meter 17 is also continued, and the control operation described in the above described "Securing of emission characteristic, and improvement in engine output" is achieved.

Note that in the present embodiment, after the start of scavenge control, the air-fuel ratio feedback control is continued while "leveling processing" is carried out in step S4. However, the present invention is not limited to this. After the start of scavenge control, the control processing may be switched to the control processing of feedforward-controlling the air-fuel ratio in the above described step S4. In this case, the values of the learning values $b_{k-1}$, $b_k$, $b_{k+1}$ and $b_{k+2}$ also can be respectively used in the air-fuel ratio control, and fuel injection amount correction for making "fuel injection amount calculated from the intake air amount and the control target air-fuel ratio" correspond to "fuel injection amount for making the air-fuel ratio of the exhaust gas correspond to stoichiomery in reality" can be performed. Accordingly, reduction in air-fuel ratio controllability during scavenge control can be restrained.

Note that in the present embodiment, the dual injection system including the port injection valve 108 and the cylinder injection valve 110 is provided for each of the cylinders 100. However, the present invention is not limited to this, and the present invention may have a configuration including only the port injection valve 108, or may have a configuration including only the cylinder injection valve 110. Further, in the present embodiment, the LPL-EGR device and the HPL-EGR device are provided, but one or both of these EGR devices may be omitted.

DESCRIPTION OF REFERENCE NUMERALS 10 cylinder block, 12 intake manifold, 14 throttle, 15 intake pressure sensor, 16 intercooler, 17 air flow meter, 18 air cleaner, 20 intake passage, 22 intake passage, 24 intake passage, 30 exhaust manifold, 32 exhaust pipe, 34 catalyst, 36 exhaust pipe, 38 A/F sensor, 40 LPL-EGR passage, 42 EGR valve, 44 HPL-EGR passage, 46 EGR cooler, 48 EGR valve, 60 turbocharger, 62 compressor, 64 turbine, 66 bypass passage, 68 air bypass valve, 70 waste gate valve, 82 accelerator opening degree sensor, 100 cylinder, 102 cylinder inner wall, 104 piston, 106 intake port, 108 port injection valve, 110 cylinder injection valve, 112 intake valve, 114 ignition plug, 116 exhaust port, 118 exhaust valve, 120 intake VVT device, 122 exhaust VVT device.

The invention claimed is:

1. An internal combustion engine, comprising:
a turbocharger;
a variable valve gear that drives an intake valve and an exhaust valve, and can drive with a valve open characteristic provided with valve overlap;
an air-fuel ratio sensor provided in an exhaust passage;
air-fuel ratio feedback control means for performing feedback correction of a fuel injection amount based on an output from the air-fuel ratio sensor, and acquiring a learning value of information relating to air-fuel ratio control from a correction amount of the feedback correction; and
scavenge air-fuel ratio control means for carrying out air-fuel ratio control by using the learning value which is a non-zero value learned during an operation of the internal combustion engine with a valve open characteristic that is not a scavenge valve open characteristic, when the variable valve gear is operated with the scavenge valve open characteristic that is a valve open characteristic having a valve overlap amount of such a degree that blow-by of intake air occurs in an intake stroke during an operation of the turbocharger.

2. The internal combustion engine according to claim 1, wherein the air-fuel ratio feedback control means includes
means for performing feedback correction of the fuel injection amount based on the output from the air-fuel ratio sensor so that an air-fuel ratio of an exhaust gas corresponds to a control target air-fuel ratio,
means for learning a correction amount about the fuel injection amount in the feedback correction, and storing a value obtained by the learning by associating the value with an intake air amount as the learning value of the information relating to the air-fuel ratio control, and
means for correcting a deviation between an air-fuel ratio obtained from the output of the air-fuel ratio sensor and the air-fuel ratio of the exhaust gas by using the learning value, and
when an operation request under a specific load that belongs to a scavenge load region where the blow-by occurs by driving with the scavenge valve open characteristic arises during an operation of the turbocharger, the scavenge air-fuel ratio control means selects a learning value associated with an intake air amount corresponding to the specific load from a plurality of the learning values learned during an operation of the internal combustion engine at a time of operating the variable valve gear with the valve open characteristic that is not the scavenge valve open characteristic, and carries out feedback control or feedforward control of the air-fuel ratio.

3. The internal combustion engine according to claim 1, further comprising:
valve mechanism control means for operating the variable valve gear with the scavenge valve open characteristic when the learning value about the intake air amount corresponding to a specific load is already learned, and operating the variable valve gear with a valve open characteristic that is not the scavenge valve open characteristic when the learning value about the intake air amount corresponding to the specific load is not learned, when an operation request under the specific load belonging to a scavenge load region where the blow-by occurs by driving with the scavenge valve open characteristic arises during an operation of the turbocharger.

4. The internal combustion engine according to claim 3, wherein the scavenge air-fuel ratio control means carries out feedback control of the air-fuel ratio,
the scavenge air-fuel ratio control means executes leveling processing of smoothing an output signal from the air-fuel ratio sensor in a time direction, in a time period in which the valve mechanism control means operates the variable valve gear with the scavenge valve open characteristic, and
the scavenge air-fuel ratio control means performs feedback correction of the fuel injection amount based on the learning value and the smoothed signal, in the time period in which the valve mechanism control means operates the variable valve gear with the scavenge valve open characteristic.

5. The internal combustion engine according to claim 1, further comprising:
an air flow meter; and
a catalyst that is provided downstream of the air-fuel ratio sensor in the exhaust passage,
wherein the scavenge air-fuel ratio control means calculates the fuel injection amount based on a control target air-fuel ratio by using an intake air amount obtained from an output from the air flow meter when the variable valve gear is operated with the scavenge valve open characteristic during an operation of the turbocharger.

6. An internal combustion engine, comprising:
a turbocharger;
a variable valve gear that drives an intake valve and an exhaust valve, and can drive with a valve open characteristic provided with valve overlap;
an air-fuel ratio sensor provided in an exhaust passage;
air-fuel ratio control means for performing feedback correction of a fuel injection amount based on an output from the air-fuel ratio sensor, acquiring a learning value of information relating to air-fuel ratio control from a correction amount of the feedback correction, and carrying out air-fuel ratio control by using the learning value which is a non-zero value learned during an operation of the internal combustion engine with a valve open characteristic that is not a scavenge valve open characteristic that is a valve open characteristic having a valve overlap amount of such a degree that blow-by of intake air occurs in an intake stroke during an operation of the turbocharger; and
valve mechanism control means capable of control of driving the variable valve gear with the scavenge valve open characteristic, and, when an operation request arises, which is under a specific load in a predetermined high load region during an operation of the turbocharger, operating the variable valve gear with the scavenge valve open characteristic when control by the air-fuel ratio control means is carried out in an equal intake air amount region of the specific load before the operation request, and operating the variable valve gear with a valve open characteristic that is not the scavenge valve open characteristic, when the control by the air-fuel ratio control means is not carried out in the equal intake air amount region of the specific load before the operation request.

7. An internal combustion engine, comprising:
a turbocharger;
a variable valve gear that drives an intake valve and an exhaust valve, and can drive with a valve open characteristic provided with valve overlap;
an air-fuel ratio sensor provided in an exhaust passage; and
an electronic control unit having control logic configured to:
  perform feedback correction of a fuel injection amount based on an output from the air-fuel ratio sensor, and acquiring a learning value of information relating to air-fuel ratio control from a correction amount of the feedback correction; and
  process air-fuel ratio control by using the learning value which is a non-zero value learned during an operation of the internal combustion engine with a valve open characteristic that is not a scavenge valve open characteristic, when the variable valve gear is operated with the scavenge valve open characteristic that is a valve open characteristic having a valve overlap amount of such a degree that blow-by of intake air occurs in an intake stroke during an operation of the turbocharger.

8. An internal combustion engine, comprising:
a turbocharger;
a variable valve gear that drives an intake valve and an exhaust valve, and can drive with a valve open characteristic provided with valve overlap;
an air-fuel ratio sensor provided in an exhaust passage;
an electronic control unit having control logic configured to:
  process air-fuel ratio control for performing feedback correction of a fuel injection amount based on an output from the air-fuel ratio sensor, acquiring a learning value of information relating to air-fuel ratio control from a correction amount of the feedback correction, and carrying out air-fuel ratio control by using the learning value which is a non-zero value learned during an operation of the internal combustion engine with a valve open characteristic that is not a scavenge valve open characteristic that is a valve open characteristic having a valve overlap amount of such a degree that blow-by of intake air occurs in an intake stroke during an operation of the turbocharger; and
  process valve mechanism control capable of control of driving the variable valve gear with the scavenge valve open characteristic, and, when an operation request arises, which is under a specific load in a predetermined high load region during an operation of the turbocharger, operating the variable valve gear with the scavenge valve open characteristic when the air-fuel ratio control is carried out in an equal intake air amount region of the specific load before the operation request, and operating the variable valve gear with a valve open characteristic that is not the scavenge valve open characteristic, when the air-fuel ratio control is not carried out in the equal intake air amount region of the specific load before the operation request.

* * * * *